(12) United States Patent
Burton et al.

(10) Patent No.: US 9,959,209 B1
(45) Date of Patent: May 1, 2018

(54) DATA STORAGE DEVICE ADJUSTING COMMAND RATE PROFILE BASED ON OPERATING MODE

(75) Inventors: Scott E. Burton, Westminster, CO (US); Kenny T. Coker, Firestone, CO (US); Robert M. Fallone, Laguna Niguel, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 1688 days.

(21) Appl. No.: 12/730,078

(22) Filed: Mar. 23, 2010

(51) Int. Cl.
*G06F 3/00* (2006.01)
*G06F 3/06* (2006.01)
*G06F 12/0866* (2016.01)

(52) U.S. Cl.
CPC ........ *G06F 12/0866* (2013.01); *G06F 3/0611* (2013.01); *G06F 3/061* (2013.01); *G06F 3/0613* (2013.01); *G06F 3/0629* (2013.01); *G06F 3/0659* (2013.01); *G06F 3/0674* (2013.01); *G06F 3/0679* (2013.01)

(58) Field of Classification Search
None
See application file for complete search history.

(56) References Cited

U.S. PATENT DOCUMENTS

| | | |
|---|---|---|
| 5,680,539 A | 10/1997 | Jones |
| 5,778,420 A | 7/1998 | Shitara et al. |
| 5,953,689 A * | 9/1999 | Hale et al. .................... 702/186 |
| 6,408,357 B1 | 6/2002 | Hanmann et al. |
| 6,429,990 B2 | 8/2002 | Serrano et al. |
| 6,636,909 B1 | 10/2003 | Kahn et al. |
| 6,678,793 B1 | 1/2004 | Doyle |
| 6,807,590 B1 | 10/2004 | Carlson et al. |
| 6,836,785 B1 | 12/2004 | Bakshi et al. |
| 6,862,151 B2 | 3/2005 | Hoskins et al. |
| 6,882,489 B1 | 4/2005 | Brunnett et al. |
| 6,900,958 B1 | 5/2005 | Yi et al. |
| 7,154,690 B1 | 12/2006 | Brunnett et al. |
| 7,194,562 B2 | 3/2007 | Barnes et al. |
| 7,274,639 B1 | 9/2007 | Codilian et al. |
| 7,315,917 B2 | 1/2008 | Bennett et al. |
| 7,321,477 B2 | 1/2008 | Suzuki et al. |
| 7,411,757 B2 | 8/2008 | Chu et al. |
| 7,421,520 B2 | 9/2008 | Wilkins et al. |
| 7,461,202 B2 | 12/2008 | Forrer, Jr. et al. |
| 7,525,745 B2 | 4/2009 | Nitta |
| 7,587,621 B2 | 9/2009 | Krauthgamer et al. |
| 2003/0229755 A1 * | 12/2003 | Espeseth et al. ............. 711/112 |
| 2005/0152057 A1 | 7/2005 | Schmidt |
| 2005/0166014 A1 | 7/2005 | Kobayashi et al. |
| 2005/0289312 A1 * | 12/2005 | Ghosal et al. ................ 711/167 |
| 2006/0112155 A1 * | 5/2006 | Earl et al. .................... 707/206 |
| 2007/0208849 A1 | 9/2007 | Ely et al. |
| 2008/0005410 A1 | 1/2008 | Mies et al. |
| 2008/0024899 A1 * | 1/2008 | Chu et al. ....................... 360/69 |

(Continued)

*Primary Examiner* — Jared Rutz
*Assistant Examiner* — Marwan Ayash

(57) ABSTRACT

A data storage device is disclosed comprising a non-volatile memory. A command rate profile is initialized, wherein the command rate profile defines a limit on a number of access commands received from a host as a function of an internal parameter of the data storage device. The command rate profile is adjusted in response to a change in operating mode.

4 Claims, 10 Drawing Sheets

(56) References Cited

U.S. PATENT DOCUMENTS

2008/0209109 A1 8/2008 Lasser
2008/0250202 A1 10/2008 Conley et al.
2009/0006720 A1 1/2009 Traister

* cited by examiner

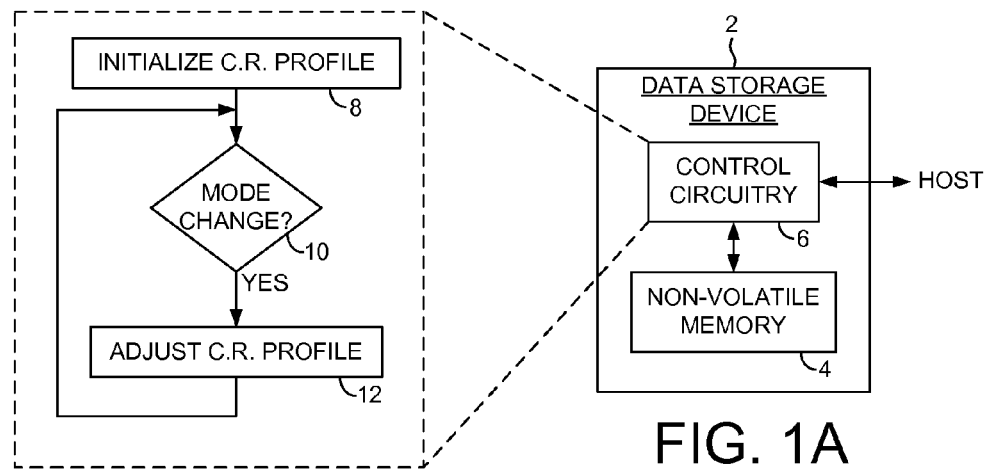
FIG. 1B
FIG. 1A
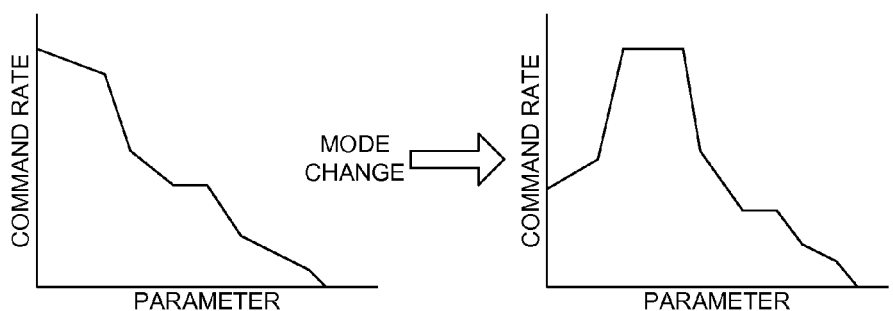
FIG. 1C

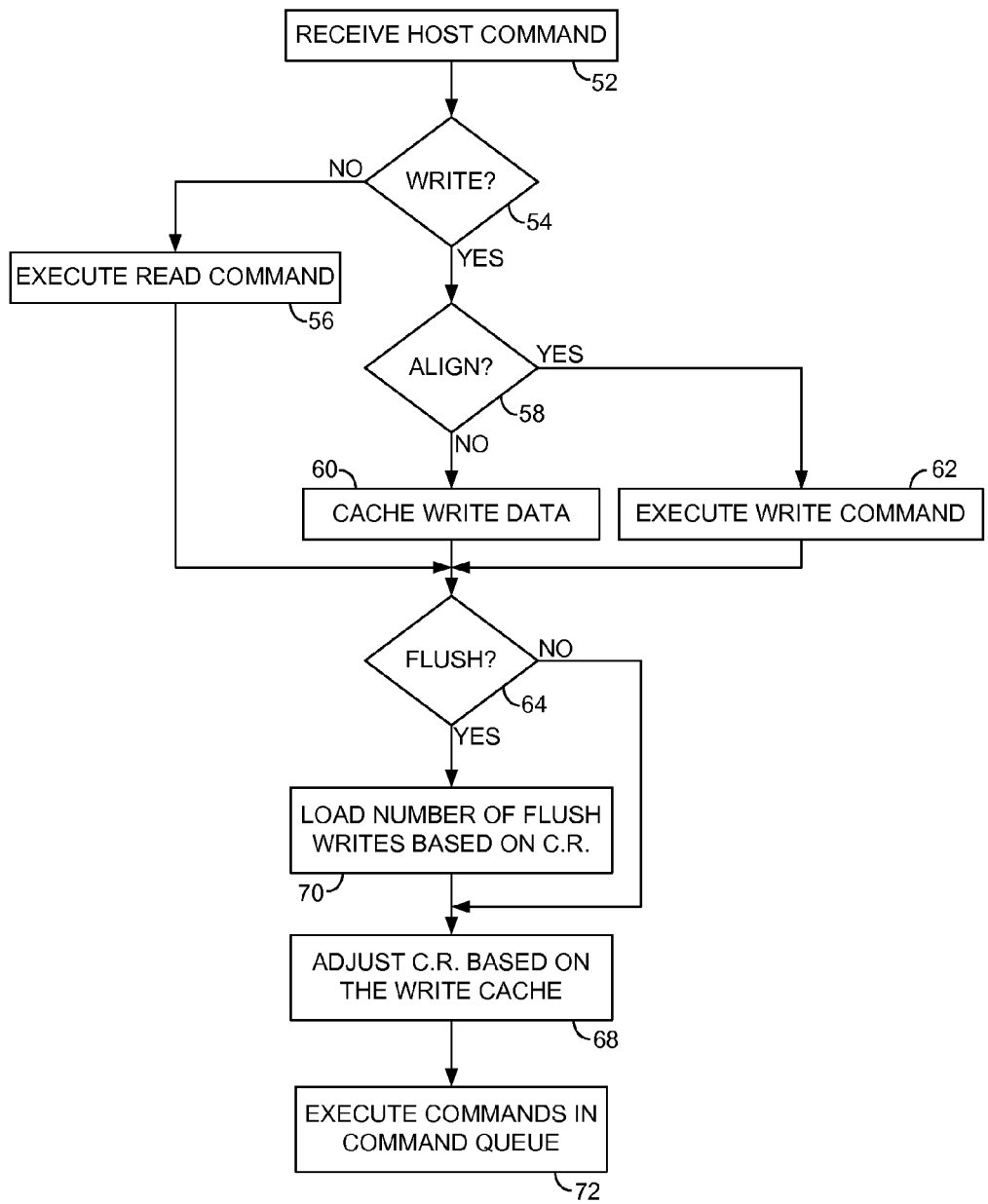

DATA STORAGE DEVICE ADJUSTING COMMAND RATE PROFILE BASED ON OPERATING MODE

BACKGROUND

Data storage devices, such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., Flash memory). A performance metric for a data storage device may include the number of host access commands processed over a period of time (e.g., instructions per second or IOPS). The throughput of host commands (write/read) is typically influenced by a number of considerations, such as the latency in accessing the non-volatile memory (e.g., the mechanical latency of seeking a head to a target data track in a disk drive).

BRIEF DESCRIPTION OF THE DRAWINGS

FIG. 1A shows a data storage device according to an embodiment of the present invention comprising a non-volatile memory and control circuitry.

FIG. 1B is a flow diagram according to an embodiment of the present invention wherein a command rate profile is adjusted based on an operating mode.

FIG. 1C illustrates an example adjustment to the command rate profile based on an operating mode change according to an embodiment of the present invention.

FIG. 6A shows an embodiment of the present invention wherein host access commands and flush write commands are loaded into a command queue.

FIG. 6B is a flow diagram according to an embodiment of the present invention wherein a number of flush write commands are loaded into the command queue based on the current command rate.

DETAILED DESCRIPTION OF EMBODIMENTS OF THE INVENTION

FIG. 1A shows data storage device 2 according to an embodiment of the present invention comprising a non-volatile memory 4 and control circuitry 6. In one embodiment, the control circuitry 6 executes the flow diagram of FIG. 1B wherein a command rate profile is initialized (step 8). The command rate profile defines a limit on a number of access commands received from a host as a function of an internal parameter of the data storage device 2. When an operating mode of the storage device changes (step 10), the command rate profile is adjusted (step 12).

FIG. 1C shows an embodiment wherein a command rate of the data storage device changes relative to any suitable parameter, for example, the command rate may decrease as the parameter value increases. As the command rate decreases, the host throughput of the data storage device decreases to accommodate the changing parameter value (e.g., the command rate may be decreased to allow the data storage device to perform queued background commands). When an operating mode of the storage device changes, the command rate profile changes, such as by shifting when the maximum command rate occurs relative to the parameter value as illustrated in FIG. 1C.

Figure 2A:
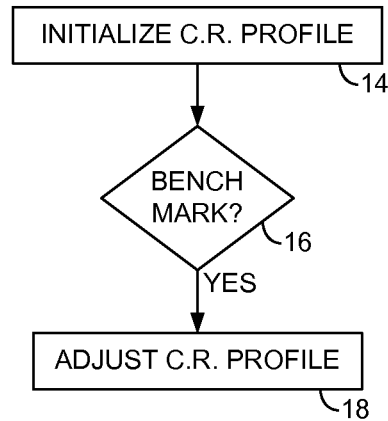
FIG. 2A is a flow diagram according to an embodiment of the present invention wherein the command rate profile is adjusted prior to executing a benchmark test.
Figure 2B:
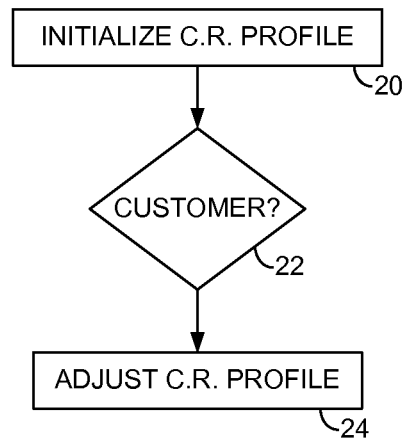
FIG. 2B is a flow diagram according to an embodiment of the present invention wherein the command rate profile is adjusted based on a particular target customer.

The command rate profile may be adjusted relative to any suitable operating mode. FIG. 2A shows a flow diagram according to an embodiment wherein after initializing the command rate profile (step 14) a mode command is received indicating the host is preparing to execute a benchmark test on the data storage device (step 16). The command rate profile is adjusted in any suitable manner (step 18), for example, to better facilitate the benchmark test. In an embodiment illustrated in FIG. 2B, after initializing the command rate profile (step 20) a mode command is received indicating a target customer for the data storage device (step 22). The command rate profile is adjusted in any suitable manner (step 24), for example, to maintain a higher host throughput relative to the parameter value. When the parameter value (e.g., queued background commands) exceeds a high threshold, the command rate may be reduced significantly. However, certain customers may prefer a higher level of performance that is interrupted periodically. For example, in enterprise applications when a first data storage device reduces the command rate, a second data storage device may be selected to service access requests until the first data storage device increases its command rate.

Figure 2C:
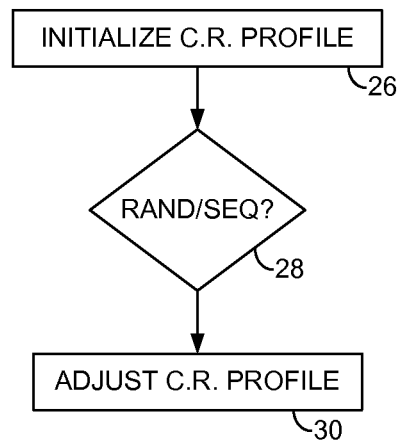
FIG. 2C is a flow diagram according to an embodiment of the present invention wherein the command rate profile is adjusted relative to a random and sequential operating modes.
Figure 2D:
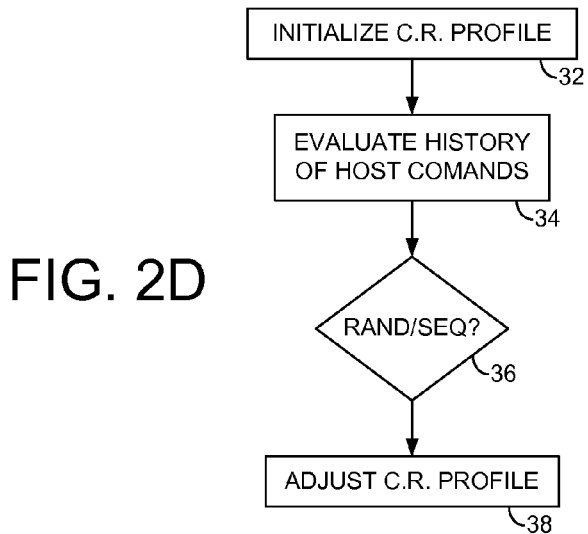
FIG. 2D is a flow diagram according to an embodiment of the present invention wherein the command rate profile is adjusted based on a history of host access commands.
Figure 2E:
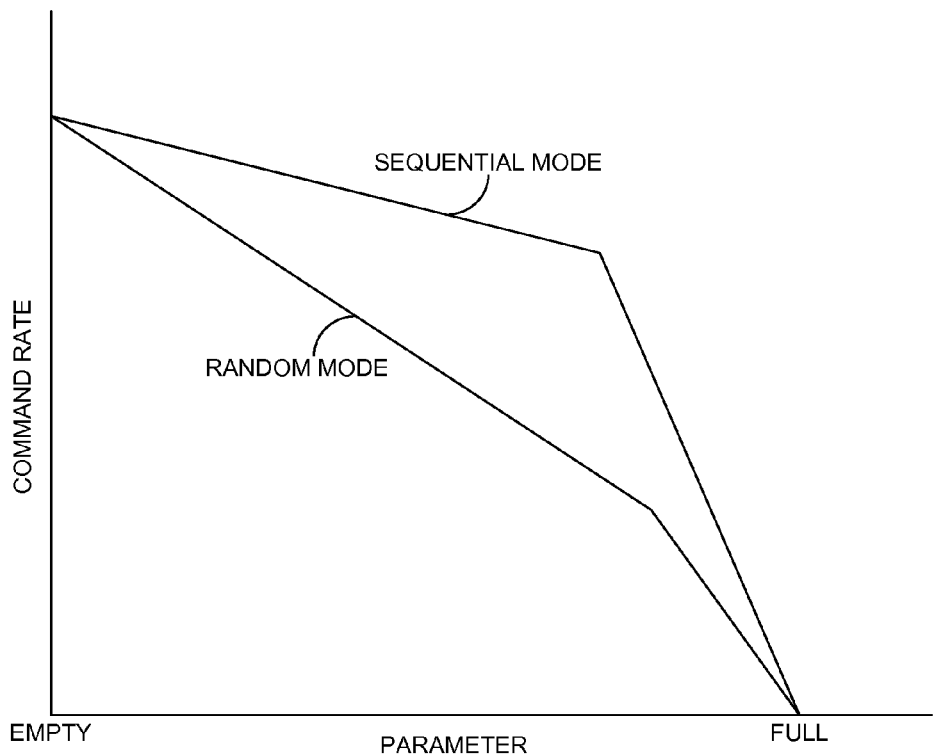
FIG. 2E illustrates an example adjustment to the command rate profile based on a random/sequential operating mode according to an embodiment of the present invention.

FIG. 2C shows an embodiment of the present invention wherein after initializing a command rate profile (step 26) a mode command is received indicating the data storage device will be accessed in one of a random mode and a sequential mode (step 28) and the command rate adjusted accordingly (step 30). In an alternative embodiment shown in FIG. 2D, after initializing the command rate profile (step 32) a history of host commands is evaluated (step 34) to detect whether the data storage device is being accessed in a random mode or a sequential mode. When the data storage device is being accessed in a random mode (step 36), the command rate may decrease faster relative to the parameter value (step 38) as illustrated in FIG. 2E. The difference in command rate profiles may reflect a sequential operating mode that operates in bursts of host commands with periodic idle times that allow for background processing.

In one embodiment, the data storage device may change operating modes based on a power setting, and the command rate profile adjusted accordingly. For example, when attempting to conserve battery power the host may send a low power mode command to the data storage device. In response, the data storage device may adjust the command rate profile so as to decrease the command rate limit faster as a function of the internal parameter (similar to the random access profile shown in FIG. 2E). For example, in one embodiment the data storage device may decrease the bandwidth of the non-volatile memory, such as by lowering the supply voltage to a semiconductor memory or by reducing the spin rate of a disk or seek time of a head in order to reduce power consumption. Accordingly, a corresponding change in the command rate profile may be needed, for example, to allow more time for background commands.

Figure 3:
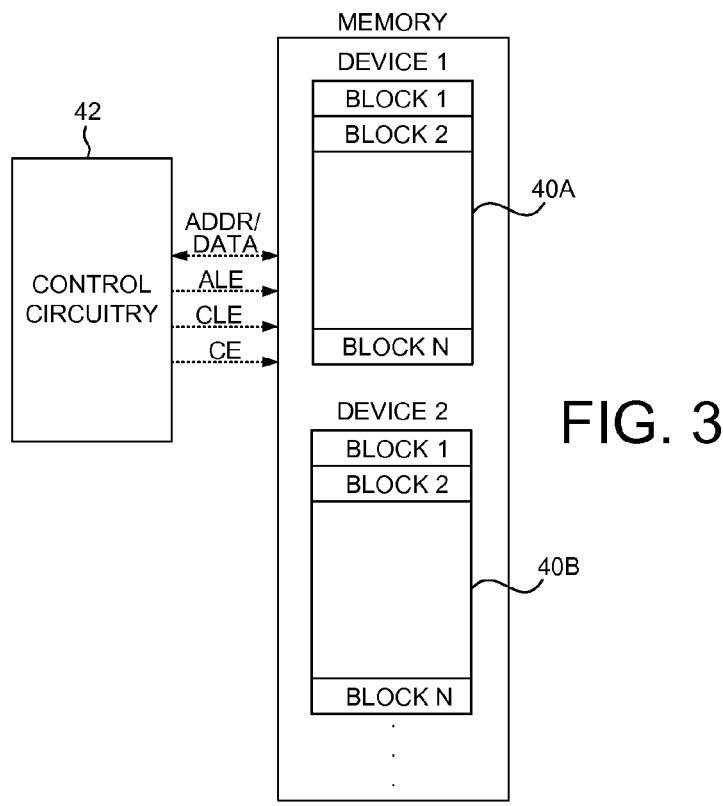
FIG. 3 shows an embodiment of the present invention wherein the data storage device comprises a solid state drive.

Any suitable data storage device may be employed in the embodiments of the present invention. FIG. 3 shows a solid state drive comprising a plurality of non-volatile semiconductor memories 40A, 40B, etc., such as Flash memories, and control circuitry 42 for executing at least part of the flow diagrams described herein. In one embodiment, the control circuitry 42 may execute background commands, such as a garbage collection operation wherein previously written blocks are erased after relocating valid data. Another background command may involve refreshing data by reading/rewriting data that may otherwise degraded over time. In one embodiment, the command rate allocated to host commands may vary based on the number background commands that the control circuitry 42 needs to execute. For example, the command rate may be reduced as the number of background commands increases to allow more time for the background commands, and the command rate profile may also be adjusted based on an operating mode as described above.

Figure 4:
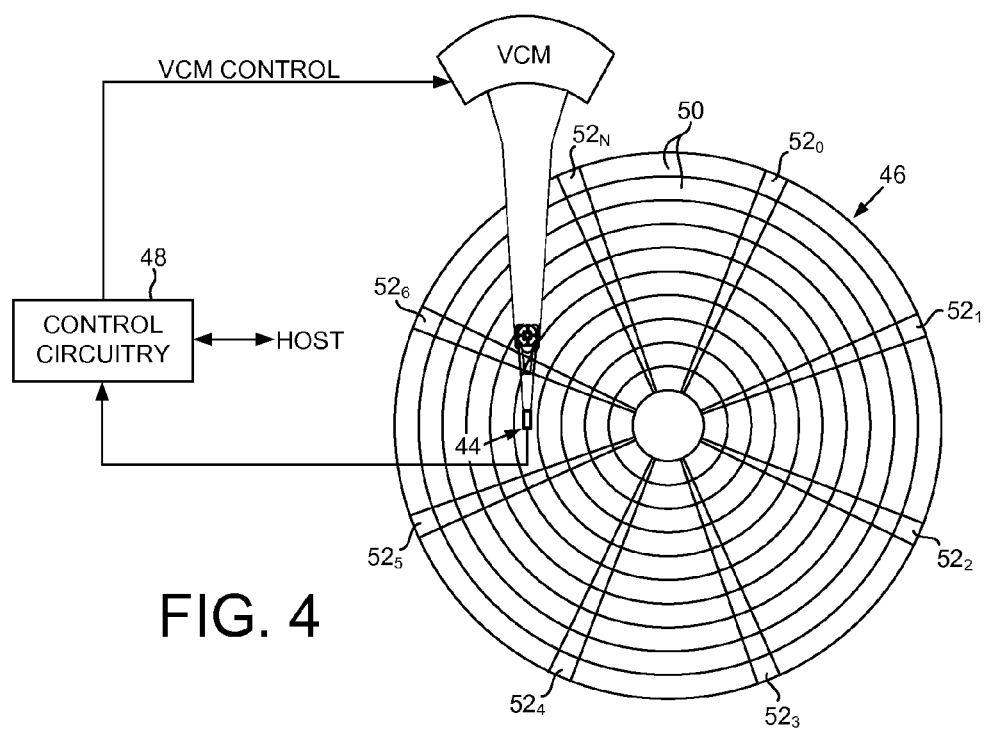
FIG. 4 shows an embodiment of the present invention wherein the data storage device comprises a disk drive.

FIG. 4 shows an embodiment of the present invention wherein the data storage device comprises a disk drive including a head 44 actuated over a disk 46 and control circuitry 48 for processing access commands received from a host. The disk 46 comprises a plurality of data tracks 50 defined by embedded servo sectors $52_0$-$52_N$, where each data track is divided into a number of data sectors. Similar to a solid state drive described above, a disk drive may perform various background commands, such verifying write operations, performing data lifeguard and/or refresh operations, performing garbage collection, calibrating various parameters, or flushing a write cache. In one embodiment, as the number of queued background commands increases, the host command rate is reduced to allow time to perform the background commands. In other embodiments, the command rate may be adjusted relative to an environmental condition, such as temperature, which may affect the bandwidth of the disk channel (e.g., affect the maximum seek speed of the head).

Figure 5A:
FIG. 5A shows an embodiment of the present invention wherein a host block size is a fraction of a disk block size.

In one embodiment, each data sector has a disk block size that is greater than a host block size of the data blocks received in host write commands. FIG. 5A shows an example of this embodiment wherein the disk block size is four times the host block size. If a write command cannot be divided evenly by the disk block size, the modulo must be written using a read-modify-write operation. That is, the last data sector must be read, the fraction corresponding to the modulo of the write command modified, and then the last data sector written back to the disk. The latency of the read-modify-write operation is avoided in an embodiment of the present invention by temporarily storing at least the modulo of write commands in a write cache until more write data is received from the host that aligns with the cached write data. Once enough write data has been received to fill an entire data sector, the write data is flushed to the disk. This embodiment may be of particular benefit when the disk is accessed using log structured writes (e.g., shingled writes) wherein all write data is written at the end of a write buffer on the disk. In one embodiment, the command rate limit of the disk drive is adjusted as a function of the write cache (e.g., how much write data is stored in the write cache).

Figure 5B:
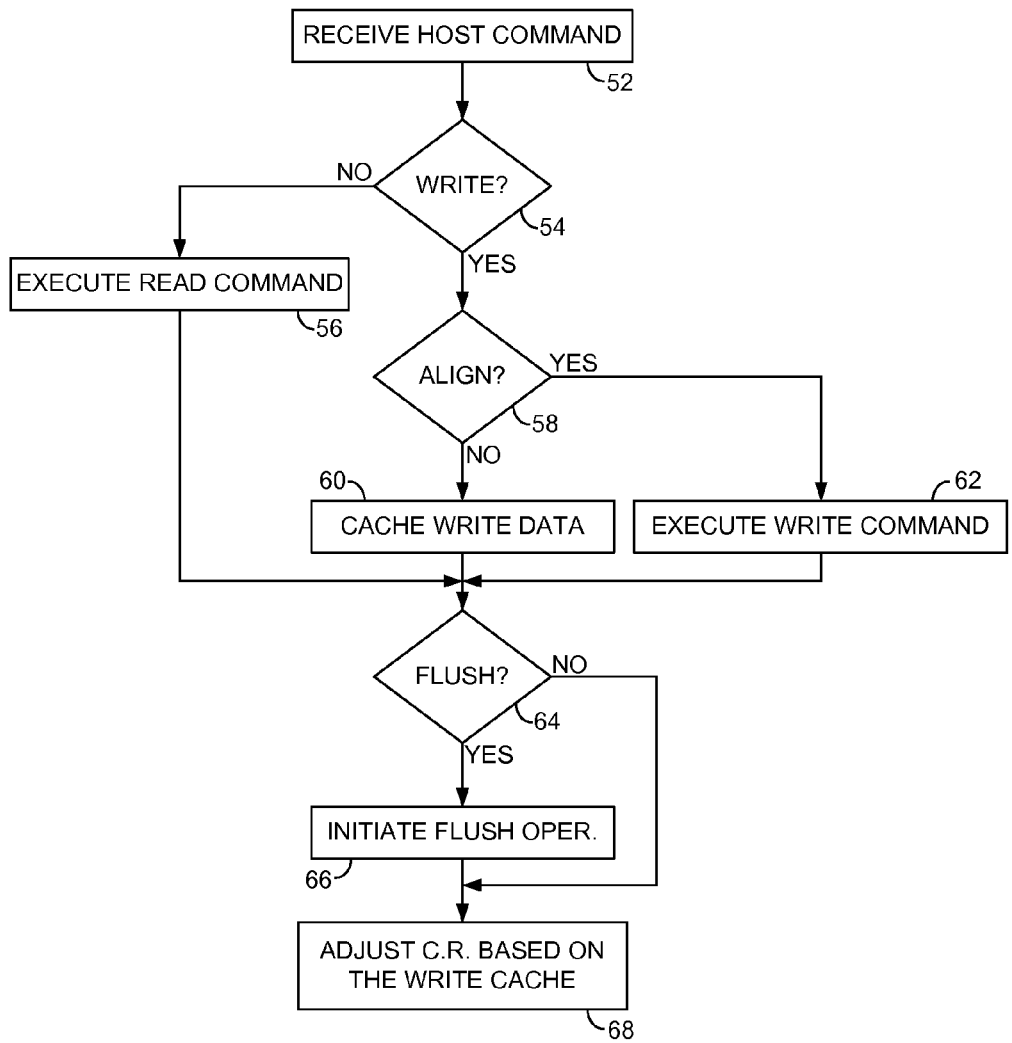
FIG. 5B is a flow diagram according to an embodiment of the present invention wherein when a misalignment between the host data blocks and the disk block size is detected, at least one of the host data blocks is stored in a write cache and the command rate adjusted based on the write cache.

FIG. 5B is a flow diagram illustrating this embodiment wherein a host command is received (step 52) and executed (or at least queued for execution) when the host command is a read command (step 56). When the host command is a write command (step 54), the size of the write command is evaluated to determine whether there is a misalignment between the host data blocks and the disk block size (step 58). If a misalignment is not detected (step 58), the write command is executed (or queued for execution) (step 62). If a misalignment is detected (step 58), at least one of the data blocks in the write command is stored in a write cache (step 60) for deferred execution. The write cache may comprise any suitable volatile or non-volatile memory, such as a random access memory (RAM), or a Flash, or a dedicated area on the disk. In any event, it may be desirable to expeditiously flush the cached write data to prevent an overflow condition. Referring again to FIG. 5B, the control circuitry 48 may detect when a flush operation should be executed (step 64) and initiate the flush operation (step 66) in any suitable manner (such as by inserting flush write commands into a command queue). In addition, the control circuitry 48 periodically evaluates the state of the write cache and adjusts the command rate limit for host commands as a function of the write cache (step 68).

Figure 5C:
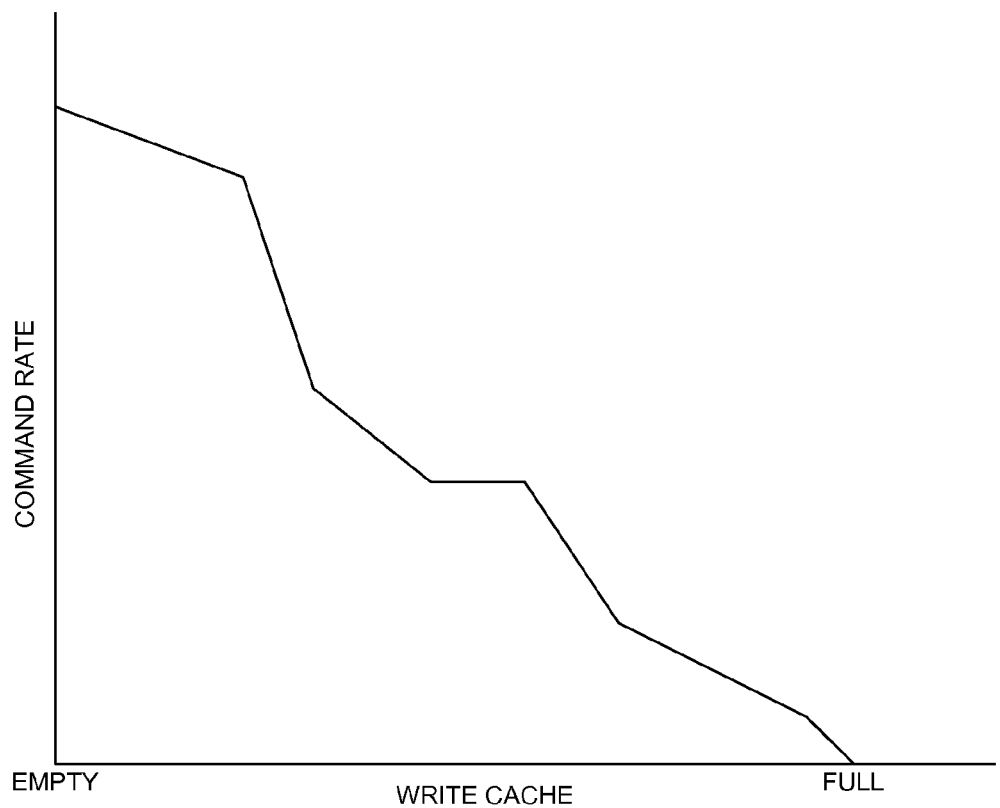
FIG. 5C illustrates an example command rate profile generated as a function of the write cache according to an embodiment of the present invention.

The command rate limit may be adjusted by the control circuitry 48 in any suitable manner using any suitable command rate profile. FIG. 5C illustrates an example command rate profile wherein as the amount of cached write data increases, the command rate limit decreases to allow more time to perform the background flush commands. In one embodiment, the command rate profile shown in FIG. 5C may be adjusted based on an operating mode, such as to accommodate a benchmark test or a particular customer, random versus sequential mode, a power save mode, etc.

FIG. 6A shows an embodiment of the present invention wherein the disk drive comprises a command queue for storing host access commands (write/read commands) as well as background commands such as flush write commands for flushing the write data from the write cache. In an embodiment shown in FIG. 6B, when it's time to perform a flush operation (step 64) the control circuitry loads a number of flush write commands into the command queue based on the current command rate limit (step 70). For example, as the command rate limit decreases, the control circuitry may load more flush write commands (or bigger flush write commands) into the command queue. The commands in the command queue are then executed in any suitable order (step 72) so that both the background commands and the host access commands are serviced. In one embodiment, loading more flush write commands into the command queue reduces the available slots for host access commands thereby achieving the adjusted command rate by limiting the number of host access commands that can be loaded into the command queue. In an alternative embodiment, the command rate is limited by limiting the number of host commands that can be loaded into the command queue regardless as to the number of available slots in the command queue.

Figure 6C:
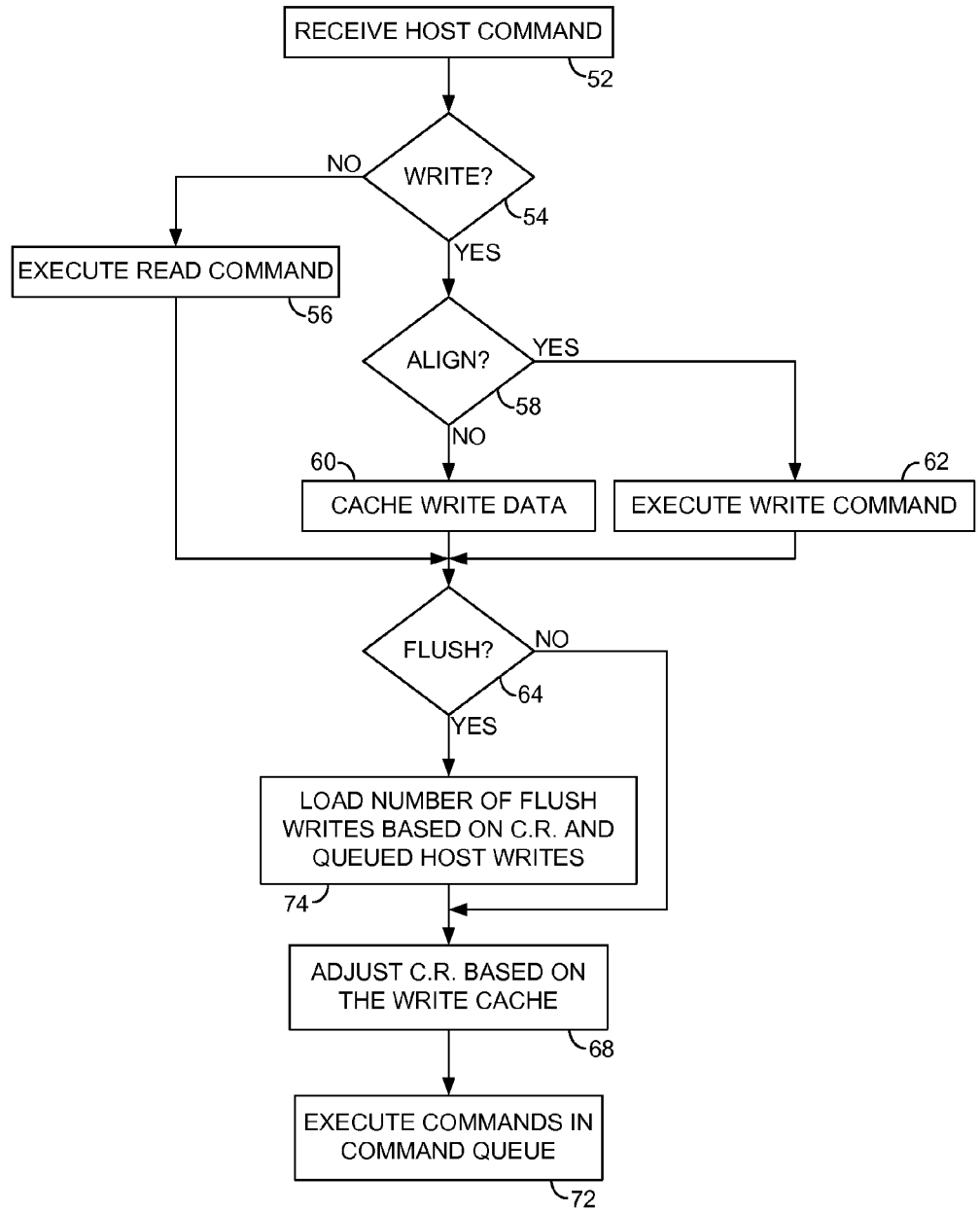
FIG. 6C is a flow diagram according to an embodiment of the present invention wherein a number of flush write commands are loaded into the command queue based on the current command rate and the number of host write commands pending in the command queue.

FIG. 6C shows a flow diagram according to an embodiment wherein the number of flush write commands loaded into the command queue is based on the current command rate limit as well as the number of host write commands pending in the command queue (step 74). For example, the control circuitry may load more flush write commands into the command queue as the number of queued host write commands increases, thereby helping to prevent the write cache from overflowing. If there are fewer host write commands in the command queue, the control circuitry may load fewer flush write commands, thereby reserving more slots in the command queue for additional host access commands.

Figure 6D:
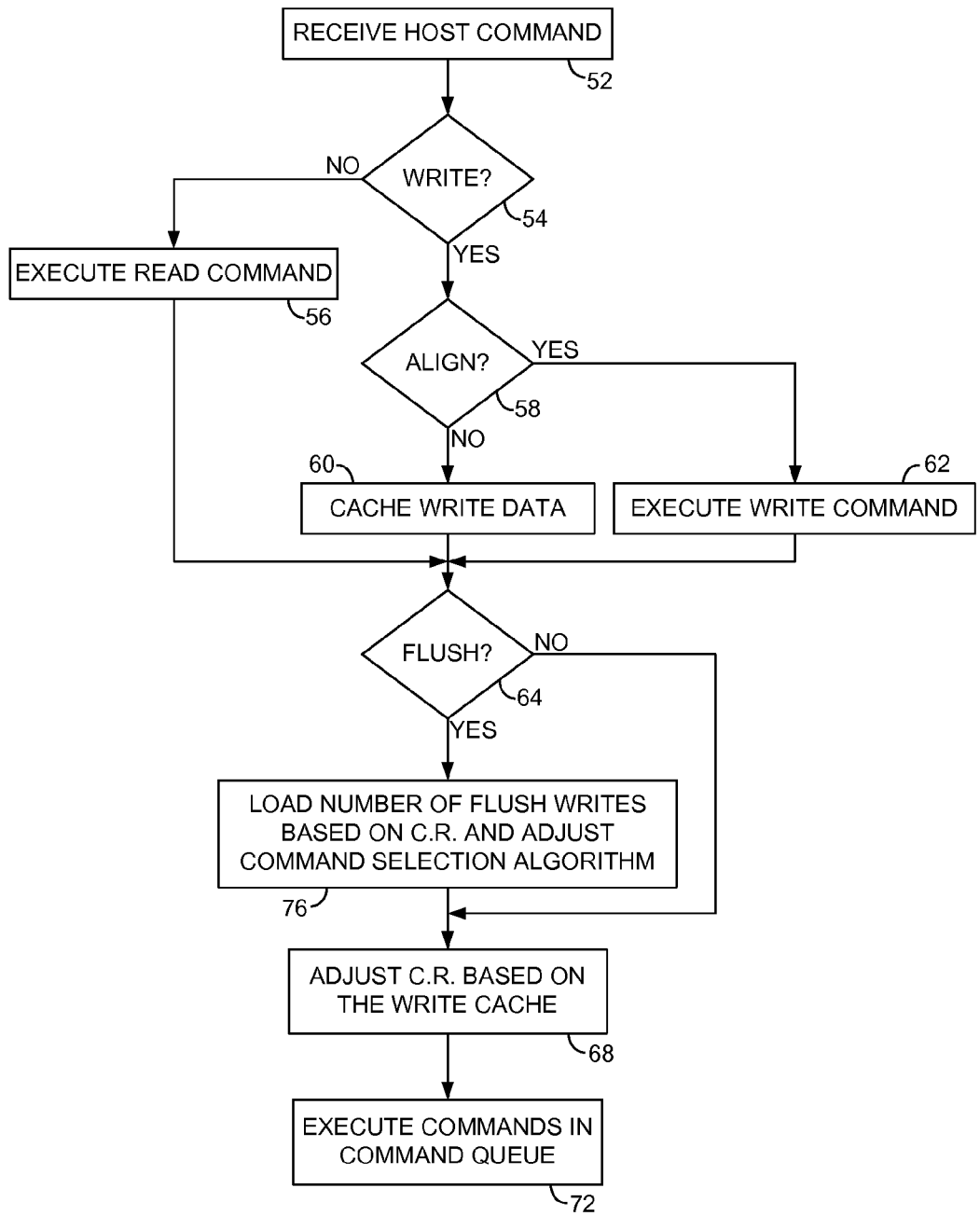
FIG. 6D is a flow diagram according to an embodiment of the present invention wherein a command selection algorithm is adjusted based on the current command rate.

FIG. 6D shows a flow diagram according to an embodiment wherein the number of flush write commands loaded into the command queue is based on the current command rate limit. In addition, a selection algorithm for selecting the execution order of the commands is adjusted based on the command rate limit (step 76). For example, if the command rate limit is low, the control circuitry may adjust the selection algorithm so that the flush write commands are executed from the command queue more frequently than the host access commands, thereby helping to prevent the write cache from overflowing. Any suitable selection algorithm may be employed in this embodiment, such as a rotational position optimization algorithm (RPO) which selects the optimal command to execute based on the radial/circumferential location of the head. The RPO algorithm may be adjusted so that a flush write command may be selected over a host access command even though the host access command may be closer to the head.

Figure 7:
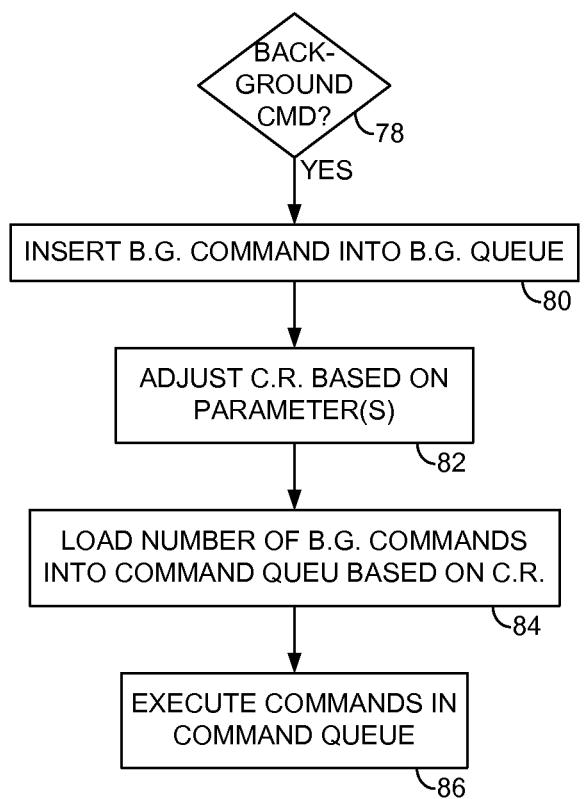
FIG. 7 is a flow diagram according to an embodiment of the present invention wherein a number of background commands are loaded into the command queue based on the current command rate.

FIG. 7 shows an embodiment of the present invention wherein the disk drive may execute any suitable background command in addition to flushing a write cache. For example, the disk drive may execute background commands including at least one of a write verify command, a refresh command, and a garbage collection command. When a background command is generated (step 78) it is inserted into a background command queue (step 80). The host command rate limit is adjusted based on one or more parameters (step 82), and then a number of the background commands are loaded into the command queue based on the command rate limit (step 84). For example, as the command rate limit is reduced, the number of background commands loaded into the command queue may be increased to ensure that the background commands are expeditiously executed together with the queued host access commands (step 86).

Any suitable control circuitry may be employed to implement the flow diagrams in the embodiments of the present invention, such as any suitable integrated circuit or circuits. For example, in the embodiment wherein the data storage device comprises a disk drive, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk of a disk drive and read into a volatile semiconductor memory when the disk drive is powered on. In yet another embodiment, the control circuitry comprises suitable logic circuitry, such as state machine circuitry.

What is claimed is:

1. A data storage device comprising:
a non-volatile memory; and
control circuitry operable to:
initialize a command rate profile, wherein the command rate profile defines a limit on a number of access commands received from a host as a function of an internal parameter of the data storage device;
detect a change in operating mode independent of a user configurable parameter; and
adjust the function of the command rate profile in response to the detected change in operating mode.

2. The data storage device as recited in claim 1, wherein the control circuitry is operable to:
detect the change in operating mode by evaluating a history of host commands to estimate whether the data storage device will be accessed in one of a random mode and a sequential mode; and
adjust the command rate profile when changing between the random mode and the sequential mode.

3. The data storage device as recited in claim 1, wherein the command rate profile defines a limit on the number of write commands received from the host.

4. The data storage device as recited in claim 1, wherein the internal parameter comprises a write cache for caching data blocks of write commands received from the host.

* * * * *